(12) United States Patent
Akai

(10) Patent No.: US 6,314,678 B1
(45) Date of Patent: Nov. 13, 2001

(54) CERAMIC WICKING DEVICE AND METHOD OF MANUFACTURING SAME

(75) Inventor: Tatsuo Akai, Izumisano (JP)

(73) Assignee: Phytoculture Control Co., Ltd., Osaka (JP)

( * ) Notice: Subject to any disclaimer, the term of this patent is extended or adjusted under 35 U.S.C. 154(b) by 0 days.

(21) Appl. No.: 09/269,233

(22) PCT Filed: Sep. 24, 1997

(86) PCT No.: PCT/JP97/03379

§ 371 Date: Mar. 23, 1999

§ 102(e) Date: Mar. 23, 1999

(87) PCT Pub. No.: WO98/14050

PCT Pub. Date: Apr. 9, 1998

(30) Foreign Application Priority Data

Sep. 30, 1996 (JP) .................................................. 8-258555
Jul. 18, 1997 (JP) .................................................. 9-193984

(51) Int. Cl.[7] ............................ A01G 31/00; A01G 27/04
(52) U.S. Cl. ................................................................ 47/80
(58) Field of Search ............................... 47/48.5, 79, 80, 47/63, 64; 52/169.6, 169.7

(56) References Cited

U.S. PATENT DOCUMENTS

| | | | |
|---|---|---|---|
| 2,084,005 | * | 6/1937 | Richards ................. 47/48.5 |
| 2,629,204 | * | 2/1953 | Dodds . | |
| 3,797,738 | * | 3/1974 | Fitzhugh . | |
| 3,990,181 | * | 11/1976 | do Valle .............. 47/48.5 X |
| 4,216,623 | * | 8/1980 | Silver ...................... 47/80 |
| 4,651,468 | * | 3/1987 | Martinez et al. .......... 47/80 |
| 4,928,426 | * | 5/1990 | Janssens ................. 47/48.5 |
| 4,982,527 | * | 1/1991 | Sprung ..................... 47/59 |
| 5,099,609 | * | 3/1992 | Yamauchi .............. 47/79 X |
| 5,315,783 | * | 5/1994 | Peng ...................... 47/79 X |

FOREIGN PATENT DOCUMENTS

| | | | |
|---|---|---|---|
| 3211985 A1 | * | 10/1983 | (DE) . |
| 3514733 A1 | * | 1/1987 | (DE) . |
| 102056 A2 | * | 3/1984 | (EP) . |
| 356689 | | 8/1929 | (JP) . |
| 62 262929 | | 11/1987 | (JP) . |
| 3 272622 | | 12/1991 | (JP) . |
| 6 30665 | | 2/1994 | (JP) . |
| 789802 | | 10/1995 | (JP) . |

OTHER PUBLICATIONS

Salmang et al. 1961. Ceramics—Physical and Chemical Fundamentals. Butterworths, London. pp. 75, 78.*

Microfilm of the specification and drawings annexed to the written application of Japanese Utility Model Application No. 144901/1989 (Laid–open No. 83045/1991) (Hokkaido Nozai Kogyo Co., Ltd.), Aug. 23, 1991.

* cited by examiner

Primary Examiner—Peter M. Poon
Assistant Examiner—Jeffery L. Gellner
(74) Attorney, Agent, or Firm—Birch, Stewart, Kolasch & Birch, LLP

(57) ABSTRACT

Roots of a cultivated plant 30 is directly made contact with the surface of a cultivating apparatus 10 comprising microporous boxes 12, 13. It is, therefore, possible to obtain a cultivating apparatus capable of attaining effortless supply of nutrient/water, water conservation, easy miniaturization and indoor cultivation.

74 Claims, 17 Drawing Sheets

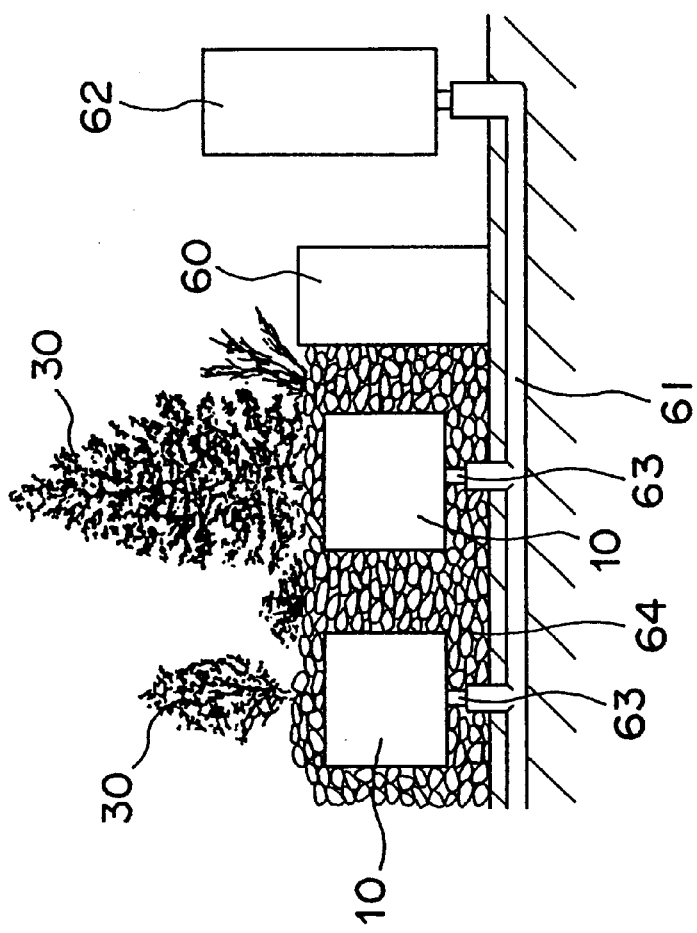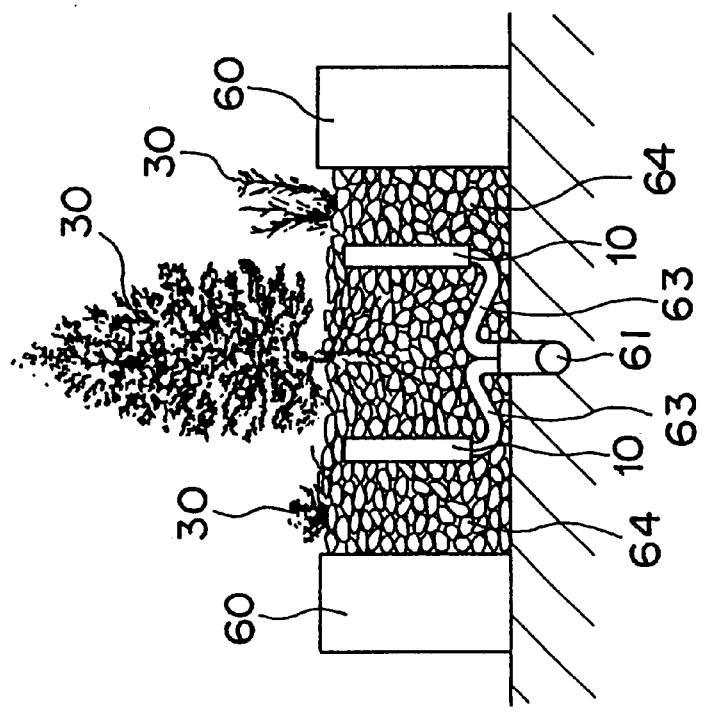
Fig. 9A
Fig. 9B

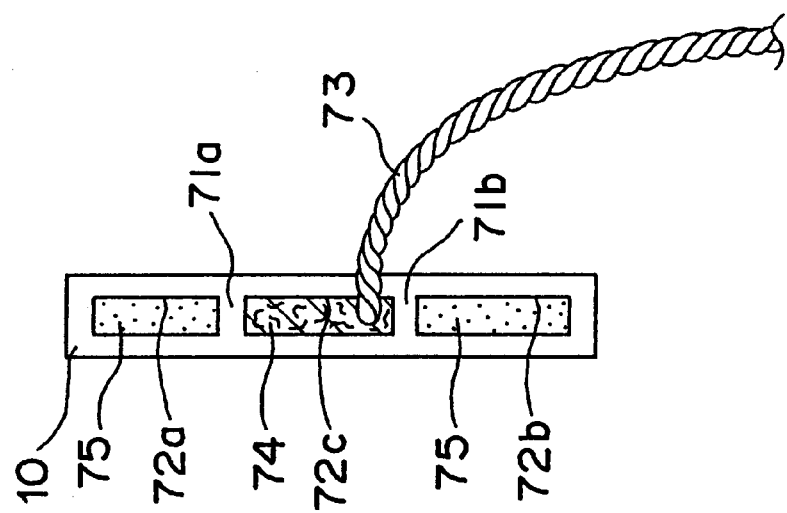
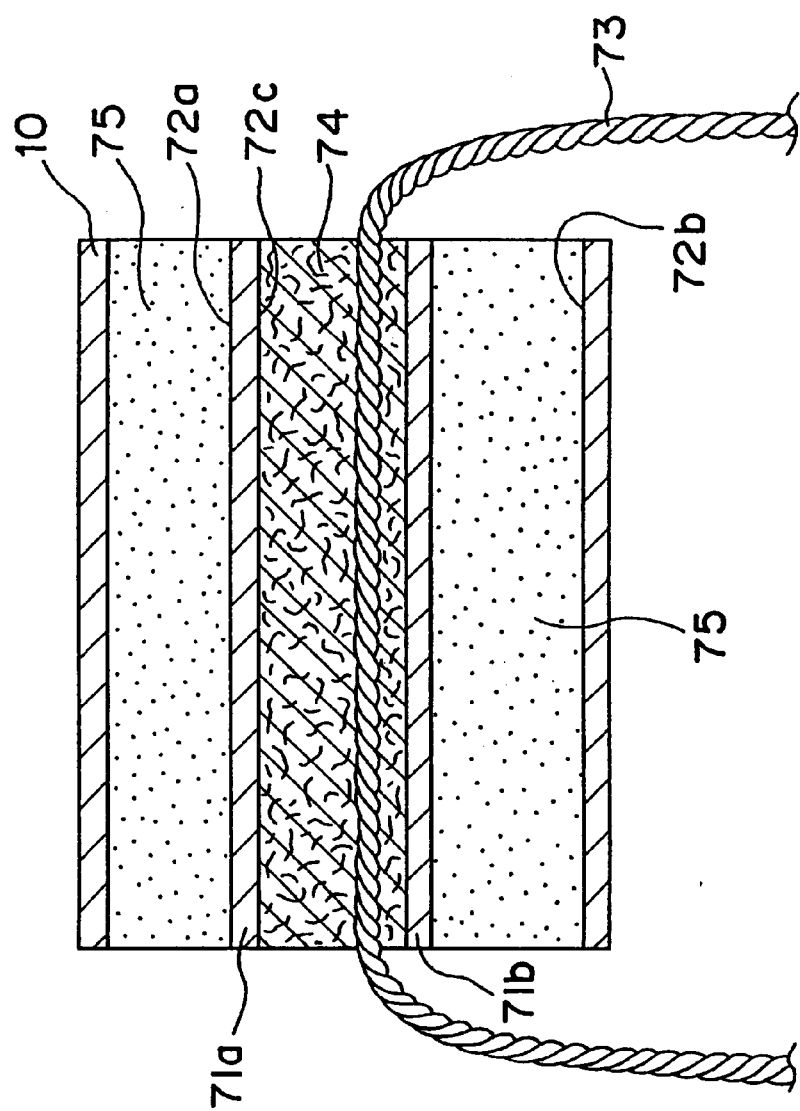

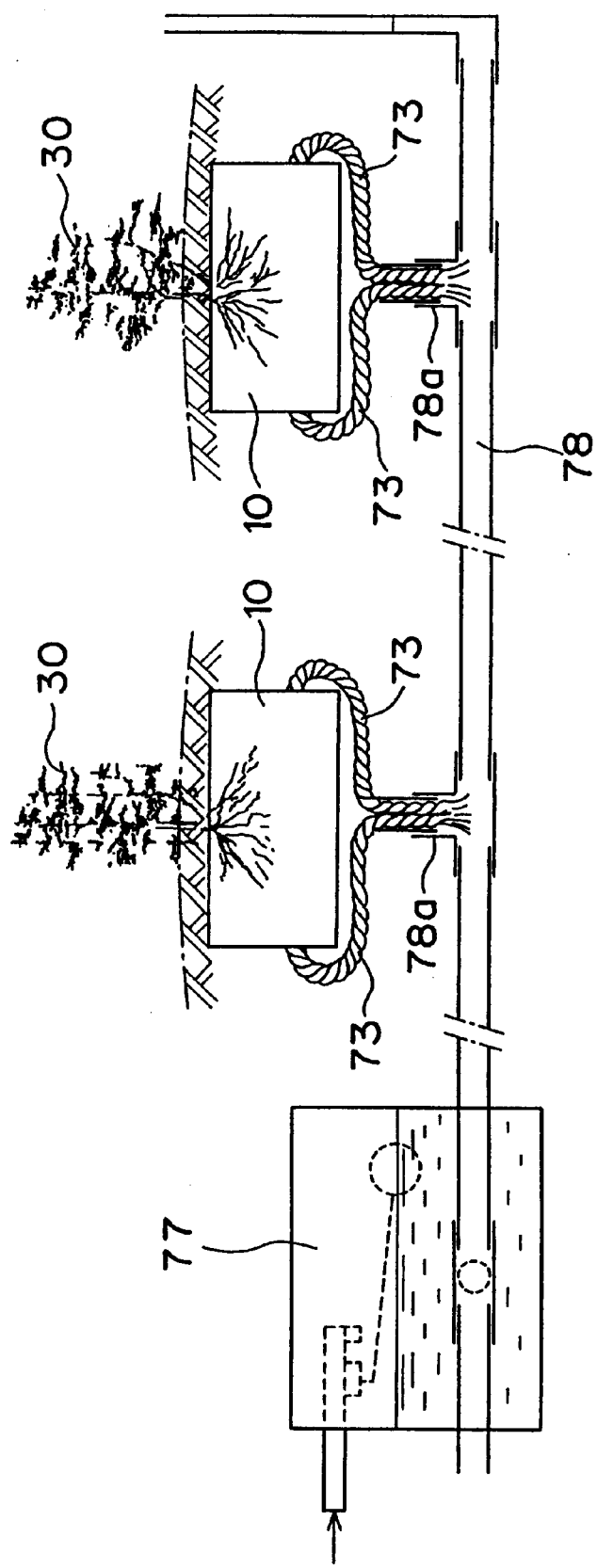

Fig.15

Water permeation test (Amount of permeation after pouring of 100 ml)

| Firing temperature | | Comp. Example 1 (760°C) | Comp. Example 2 (1,100°C) | Example 1 (1,200°C) |
|---|---|---|---|---|
| Elapsed time | 1 | (ml) | (ml) | (ml) |
| | 2 | | | |
| | 3 | | | |
| | 4 | | | |
| | 5 | 50 | 61 | 68 |
| | 6 | | | |
| | 7 | | | |
| | 8 | | | |
| | 9 | | | |
| | 10 | | | |
| | 11 | | 76 | 98 |
| | 12 | | | |
| | 24 | | | |
| | 48 | 95 | | |

Fig. 17

Water content and water content ratio test

| | Absolute dry weight (g) | Water saturation weight (g) | Water content (g) | Water content ratio (%) |
|---|---|---|---|---|
| Example 2 (1200°C) | 555.45<br>555.48<br>559.99 | 605.99<br>606.61<br>610.61 | 50.54<br>51.13<br>50.62 | 9.10<br>9.20 (9.11)<br>9.04 |
| Comp. Example 3 (1100°C) | 589.94<br>568.29<br>587.86 | 649.65<br>626.95<br>647.27 | 59.71<br>58.66<br>59.41 | 10.12<br>10.32 (10.18)<br>10.11 |
| Comp. Example 4 (1000°C) | 563.07<br>557.77<br>555.26 | 640.83<br>635.14<br>631.78 | 77.76<br>77.37<br>76.52 | 13.81<br>13.87 (13.82)<br>13.78 |

CERAMIC WICKING DEVICE AND METHOD OF MANUFACTURING SAME

This application is the national phase under 35 U.S.C. §371 of PCT International Application No. PCT/JP97/03379 which has an International filing date of Sep. 24, 1997 which designated the United States of America.

TECHNICAL FIELD

The present invention relates to a cultivating apparatus, which directly supplies nutrient/water to cultivated plants.

BACKGROUND ART

A conventional cultivating apparatus, as described in Japanese Patent Kokoku Publication No. 56689/1991, is an apparatus to supply water to plants.

The above cultivating apparatus is configured such that porous pipes buried in soil are connected to a water source via a water supplying hose. The water is forced to ooze out to soil from the porous pipe connected to the water supplying hose, with the effect of a difference of negative pressure due to the lower water level of the water source than the porous pipe, thereby supplying water to the roots of cultivated plants through soil.

However, regarding this cultivating apparatus in accordance with the conventional example, water is supplied in soil with the use of the difference of negative pressure due to the level of the water source and through soil. Therefore, only if a pinhole is made in the water supplying hose, water supply becomes impossible, and time and effort are required for maintenance.

Furthermore, when an attempt is made to supply a proper amount of water depending on the types of the soil, cultivated plants and the like, fine adjustment is required, and the adjustment is not easy.

Moreover, regarding the above-mentioned cultivating apparatus, since water evaporate through soil, a large amount of water is required to be supplied, resulting in losing too much water.

In addition, since the cultivating apparatus requires soil, the entire size of the apparatus tends to be large; furthermore, soil spills cause stained floors, thereby making the apparatus not suitable for indoor use.

In order to solve the above-mentioned problems, an object of this invention is to provide a cultivating apparatus with easy maintenance, water conservation, easy miniaturization and indoor cultivation.

DISCLOSURE OF THE INVENTION

In order to attain the above-mentioned object, a first characteristic of the present invention is that nutrient/water positioned at a level lower than that of a microporous fired element having a water suction capability is supplied to the above-mentioned microporous fired element by the force of the capillary phenomenon, and that the root of the cultivated plant directly sucks nutrient/water kept in the interior of the above-mentioned microporous fired element by the force of the capillary phenomenon roots of a cultivated plant are directly made contact with the surface of a microporous fired element to supply nutrient/water required for the cultivated plant.

A second characteristic is that the cultivated plant is allowed to take root at least on the inner surfaces of the microporous fired elements disposed opposite to each other.

A third characteristic is that the cultivated plant is allowed to take root in the clearance between the microporous fired element and a water-impermeable flat element for covering the surface of the microporous fired element.

A fourth characteristic is that a part of the above-mentioned microporous fired element is made contact with a nutrient/water supply means.

With the first to fourth characteristics of the present invention, water can be directly supplied from the microporous fired element, unlike the conventional example, whereby time and effort are not required for maintenance.

In addition, the cultivated plant directly sucks the nutrient/water held in the interior of the microporous fired element as necessary.

Furthermore, since water is not supplied via soil in the cultivating apparatus of this invention, water does not evaporate from soil, water conservation can be attained. For this reason, only the minimum amount of water need to be supplied directly, and such irrigation as in the case of the conventional example is not necessary. As a result, salt in soil does not have any chance to rise to the surface, and there is no possibility of salt condensation, and even recovering of vegetation in deserts could be attained, if this invention is applied. Moreover, since cultivation is possible by using the minimum amount of nutrient/water, the consumption of fertilizer can be minimized, resulting in reducing salt accumulation caused by fertilizer, and thus preventing damage due to it.

In addition, since the cultivating apparatus of the present invention does not require soil, the apparatus can be miniaturized easily, and there is no chance that floors would be stained by spilled soil. For these reasons, compact cultivating apparatus suited for indoor cultivation can be provided. As a result, even cultivating apparatus capable of being used in the space could be obtained.

Besides, since the microporous fired element does not allow microbes to pass through, highly safe and clean cultivation can be accomplished.

Furthermore, the cultivated plant can be cultivated by supplying the nutrient/water positioned at a level lower than that of the microporous fired element by using only the force of the capillary phenomenon, not by using positive or negative pressure. For this reason, the nutrient/water does not ooze out to the surface of the cultivating apparatus. As a result, the nutrient/water does not cause as drops of water, whereby wasteful water consumption by outflow and evaporation can be prevented, resulting in water conservation. Furthermore, since the cultivated plant directly sucks the nutrient/water as necessary by using only the force of the capillary phenomenon and the suction force of the root thereof, no special power source is required to supply them, whereby the structure can be simplified.

In particular, with the second and third characteristics, the cultivated plants take root in the clearance between the microporous fired elements disposed opposite to each other or in the clearance between the microporous fired element and the water-impermeable flat element, cultivating apparatus having a small floor area can be obtained.

Additionally, with the fourth characteristic, the microporous fired element absorbs required nutrient/water by making contact with the nutrient/water supply means, whereby time and effort are not required for water supply and convenience is thus provided.

A fifth characteristic is that the above-mentioned nutrient/water supply means is made of aggregated fibers capable of holding nutrient/water.

With the fifth characteristic, since a proper amount of nutrient/water can be kept in the fibers, stable supply of them can be attained.

A sixth characteristic is that an inner space filled with fibers capable of holding nutrient/water is formed inside the above-mentioned microporous fired element.

With the sixth characteristic, since the inner space filled with the fibers capable of holding nutrient/water is formed inside the above-mentioned microporous fired element, the cultivated plants can survive from withering even if the external supply of nutrient/water are insufficient for prolonged time.

A seventh characteristic is that one end of a water supply rope consist of fiber bundle is connected to the above-mentioned nutrient/water supply means for sucking up nutrient/water by the capillary phenomenon.

With the seventh characteristic, one end of the fiber bundle is connected to the nutrient/water supply means of the microporous fired element. For this reason, nutrient/water can be supplied by the capillary phenomenon, whereby a pump or other artificial device is not necessary, and the apparatus can be simplified.

An eighth characteristic is that at least two inner spaces are formed inside the above-mentioned microporous fired element, wherein one of the inner spaces is filled with fibers capable of holding water, and the other inner space is filled with fertilizer.

With the eighth characteristic, the supply of water can be separated from the supply of nutrient. For this reason, the generation of microbes, fungi and algae is less than that in the case when nutrient/water containing nutrient and water mixed in advance is supplied, whereby the water supply rope or the like is hardly clogged. In addition, the concentration control of the nutrient/water can be done more easily than that in the case of direct supply of nutrient/water.

A ninth characteristic is that one end of the water supply rope is connected to the fibers inserted into the above-mentioned inner space for sucking up water by the capillary phenomenon of the fiber bundle thereof.

With the ninth characteristic, since one inner space is filled with inorganic fibers, water can be supplied stably. As a result, nutrient/water having a constant concentration can be supplied stably to the cultivated plant.

A tenth characteristic is that the inner space filled with the above-mentioned fibers is a through hole configured so as to be able to supply water from the opening portions on both sides thereof.

With the tenth characteristic, since water can be supplied from both sides of the inner space used as a through hole, water can be supplied evenly to the entire cultivating apparatus, resulting in even supply of nutrient/water with a constant concentration.

An eleventh characteristic is that the above-mentioned water supply rope is covered with a cylindrical shield cover.

With the eleventh characteristic, wasteful water evaporation can be prevented; the capillary phenomenon can be ensured, even in case the water supply rope is buried in ground; and since the water supply rope is not exposed to light, the generation of algae or the like can be prevented.

A twelfth characteristic is that the cultivating apparatus is produced by a method wherein the microporous fired element, to the surface of which roots of the cultivated plant is directly made contact with, is fired, and the sulfur content thereof is removed.

With the twelfth characteristic, since the sulfur content thereof is removed after the microporous fired element is fired, the plant growth hampering can be prevented. For this reason, firing can be carried out at lower firing temperature, and a microporous fired element has higher porosity and higher water holding capacity. As a result, this results in extending the range of cultivable plants.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and of the scope of the invention will become apparent to those skilled in the art form this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9A is a sectional side view, showing a sixth embodiment of the present invention; and FIG. 9B is a partially sectional front view thereof.

FIG. 11A is a cross sectional front view, showing a seventh embodiment of the present invention; and FIG. 11B is a side view thereof.

FIG. 12 is a schematic view, outlining the arrangement of the cultivating apparatuses shown in FIG. 11A.

FIG. 15 is a table, showing the measurement results of a water permeation test.

FIG. 17 is a table, showing the measurement results of a water content ratio test.

BEST MODE FOR CARRYING OUT THE INVENTION

Next, embodiments in accordance with the present invention are described below with reference to the accompanying FIG. 1 to FIG. 7.

Figure 1:
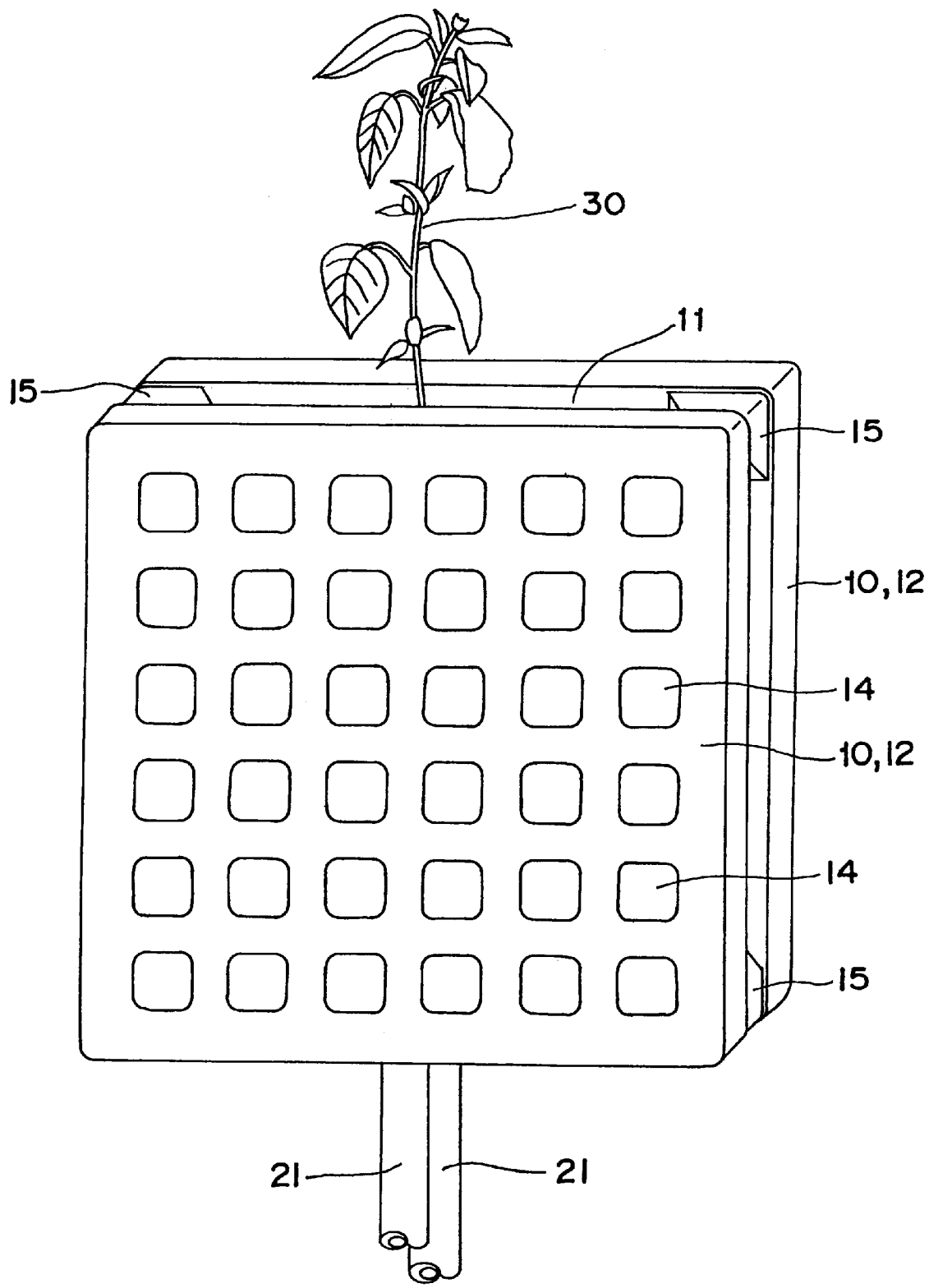
FIG. 1 is a perspective view, showing a first embodiment of the present invention.
Figure 2A:
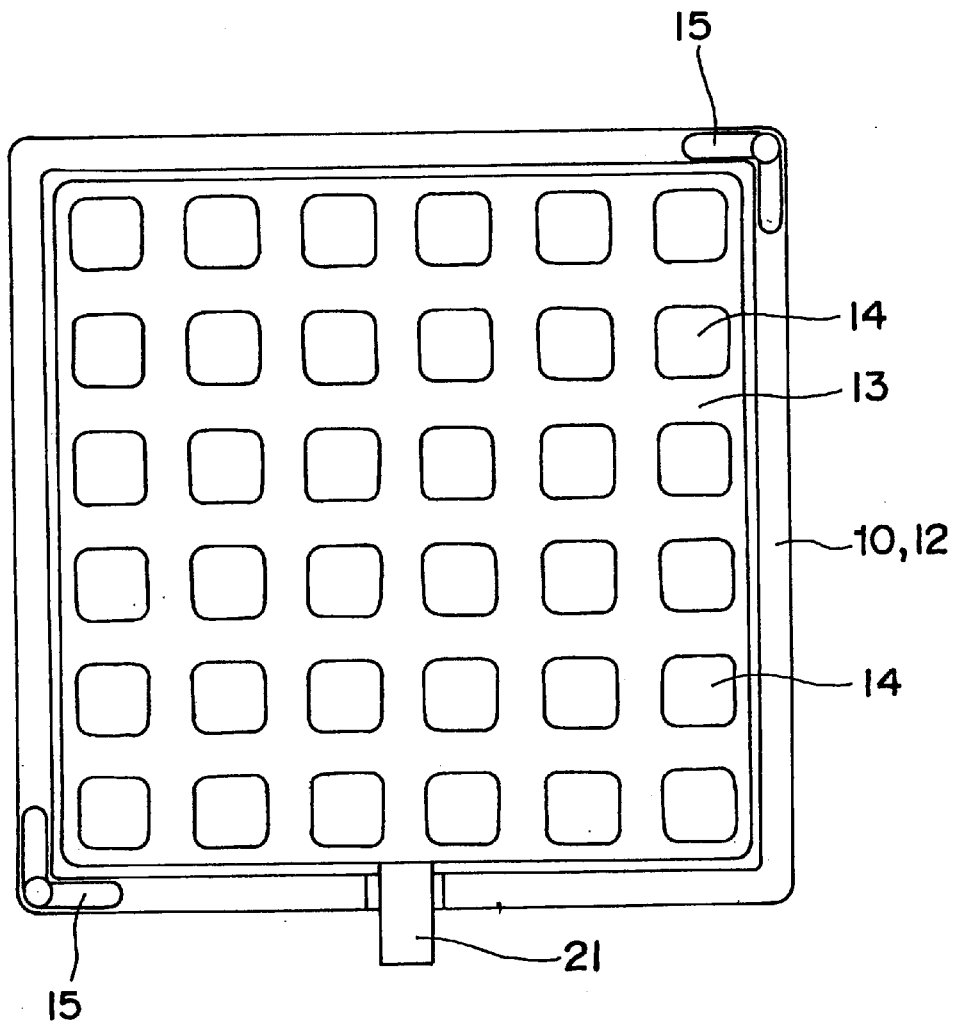
FIG. 2A is a front view, showing the cultivating apparatus shown in FIG. 1.
Figure 2B:
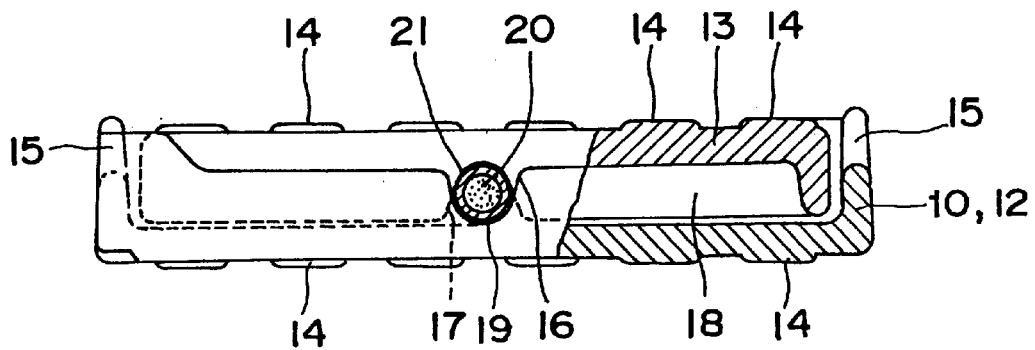
FIG. 2B is a partially cutaway bottom view, showing the cultivating apparatus shown in FIG. 2A.

In a first embodiment, as shown in FIG. 1, FIG. 2A and FIG. 2B, nutrient/water are supplied while a plant 30 is allowed to take root and supported in a clearance 11 formed between two cultivating apparatuses 10, 10 overlaid each other.

As shown in FIG. 2A and FIG. 2B, the above-mentioned cultivating apparatus 10 comprises a first microporous box 12, having a shallow bottom and a second microporous box 13, having a shallow bottom and capable of being fitted into the first microporous box 12. Both boxes are made by molding a material to be fired, such as clay, by extrusion and then by firing it.

The above-mentioned material to be fired is desired to be the material, which does not lose its voids even when fired at high temperature; the examples of this kind of material are the No. 10 Clay and the Porcelain No. 2 Clay (Shiroyama Cerapot Co., Ltd.). In particular, in order to make it more microporous to facilitate water absorption and discharge, 50 to 60% by weight of petalite should preferably be contained. Furthermore, powdery inorganic foam substances may better to be contained.

Generally as the above-mentioned petalite, a material containing 76.81% by weight of $SiO_2$, 16.96% by weight of $Al_2O_3$, 4.03% by weight of $Li_2O$, 0.26% by weight of $K_2O$ and 1.94% by weight of unavoidable impurities is used as the standard material.

A molding method can be selected appropriately from among already-existing methods, such as casting, extrusion molding, press molding, potter's wheel molding and the like for example; extrusion molding might be most suitable in view of mass production and cost saving. In addition, drying after molding can be carried out by an ordinary method in ordinary conditions.

Temperature applied to fire is from 1000° C. to 2000° C.; in particular, a temperature around 1200° C. is most suitable. If the temperature is less than 1000° C., the sulfur content is apt to remain, and a desired strength cannot be obtained; if the temperature is higher than 2000° C., a desired water permeability cannot be obtained.

A firing method can be selected appropriately from among already-existing methods, such as oxidation firing and the like, for example. The oxidation firing method is particularly advantageous in obtaining desired voids easily.

On the bottom surface of the above-mentioned first microporous box 12, nearly square projections 14 are laid out in a grid pattern at a predetermined pitch. Furthermore, roughly L-shaped ribs 15 project at the opposed corners at the fringe of the opening portion of the above-mentioned box 12, and a notch portion 16 is formed on one side of the fringe of the opening portion thereof.

The above-mentioned second microporous box 13 has a flat shape capable of being fitted into the first microporous box 12. Furthermore, on the bottom surface of the box 13, projections 14 similar to those provided on the above-mentioned first microporous box 12 are formed, and a notch portion 17 is formed on one side of the fringe of the opening portion thereof.

In addition, an inner space 18 formed by fitting the above-mentioned second microporous box 13 into the above-mentioned first microporous box 12 is filled with, for example, glass fiber, nonwoven cloth or the like (not shown) capable of holding nutrient/water.

Furthermore, a water supply pipe 21 filled with glass fibers 20 is inserted into a through hole 19 formed by the combination of the notch portions 16, 17 of the first and second microporous boxes 12, 13 so that nutrient/water can be supplied into the inner space 18 with the use of the capillary phenomenon.

Accordingly, the cultivated plant 30 takes root in the clearance 11 formed by the overlaying of the two cultivating apparatuses 10, 10 configured as described above, enabling necessary nutrient/water to be absorbed from the surface of the second microporous box 13. As a result, a cultivation environment suitable for the cultivated plant 30 can be offered.

With the present embodiment, the inner space 18 of the cultivating apparatus 10 is filled with fibers (not shown), and nutrient/water can be stored abundantly therein. As a result, this is advantageous in that the cultivated plants can survive from withering even if nutrient/water are supplied insufficiently for prolonged time.

Although the cultivated plant is cultivated in the clearance between the two cultivating apparatuses in the case of the above-mentioned embodiment, the present invention, however, is not necessarily limited to this; it is possible to cultivate a plant by sowing seeds on one side surface of one cultivating apparatus. Alternatively, it is also possible to wrap the root of a cultivated plant, which has already germinated and generated root, with sponge or nonwoven cloth, and to position the plant in the space between the two cultivating apparatuses 10, and to allow the plant to take root.

Furthermore, in the above-mentioned embodiment, although the two cultivating apparatuses are overlaid each other and used, the present invention is not necessarily limited to this, and three or more cultivating apparatuses may be overlaid one another and used.

Moreover, the surface shape of the microporous fired element of the cultivating apparatus is not limited to that described above; the surface may be a combination of projections and projected stripes so as to have a large area making contact with the root of the plant. The surface may be just a flat surface.

Figure 3:
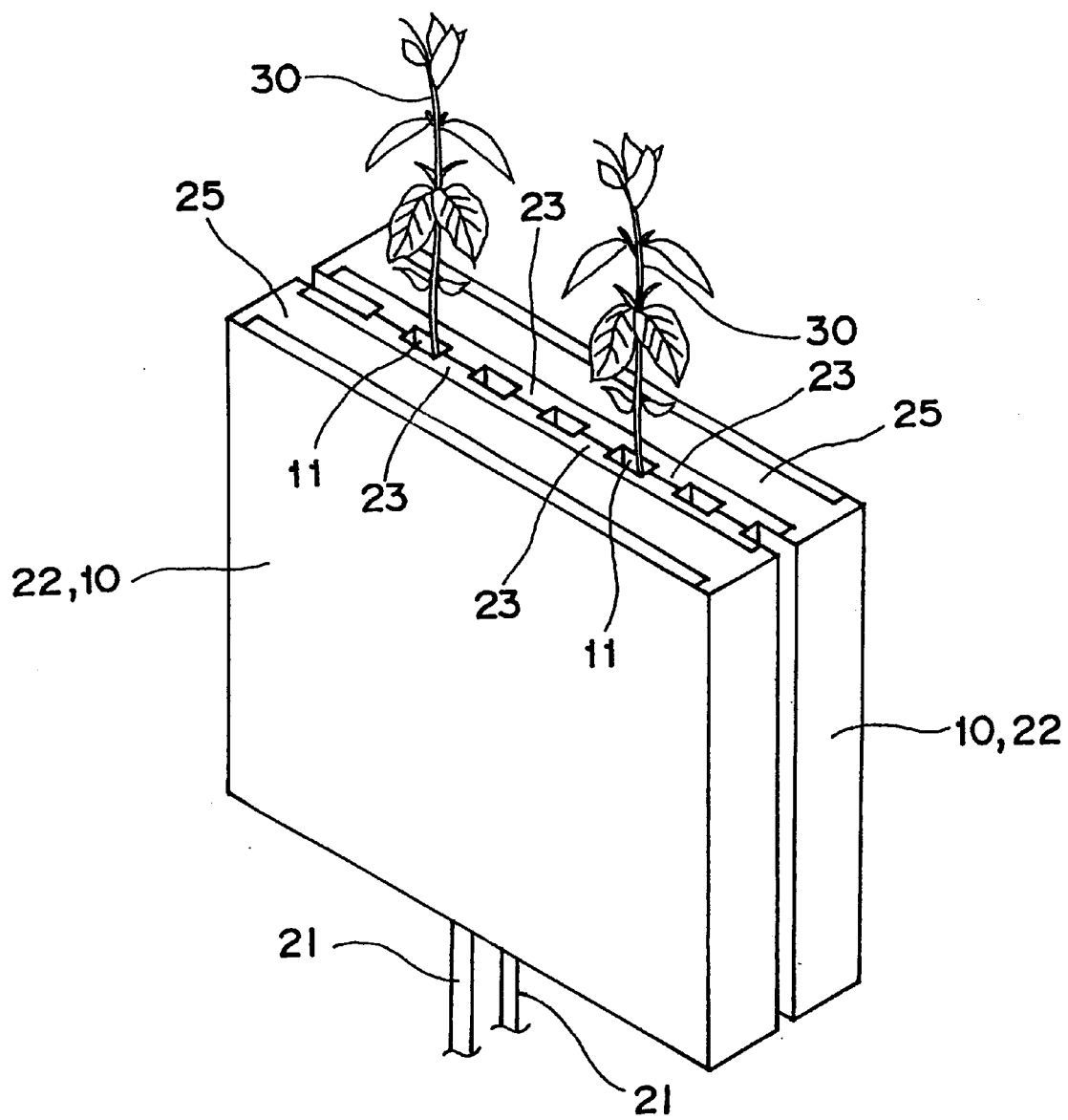
FIG. 3 is a perspective view, showing a second embodiment of the present invention.
Figure 4:
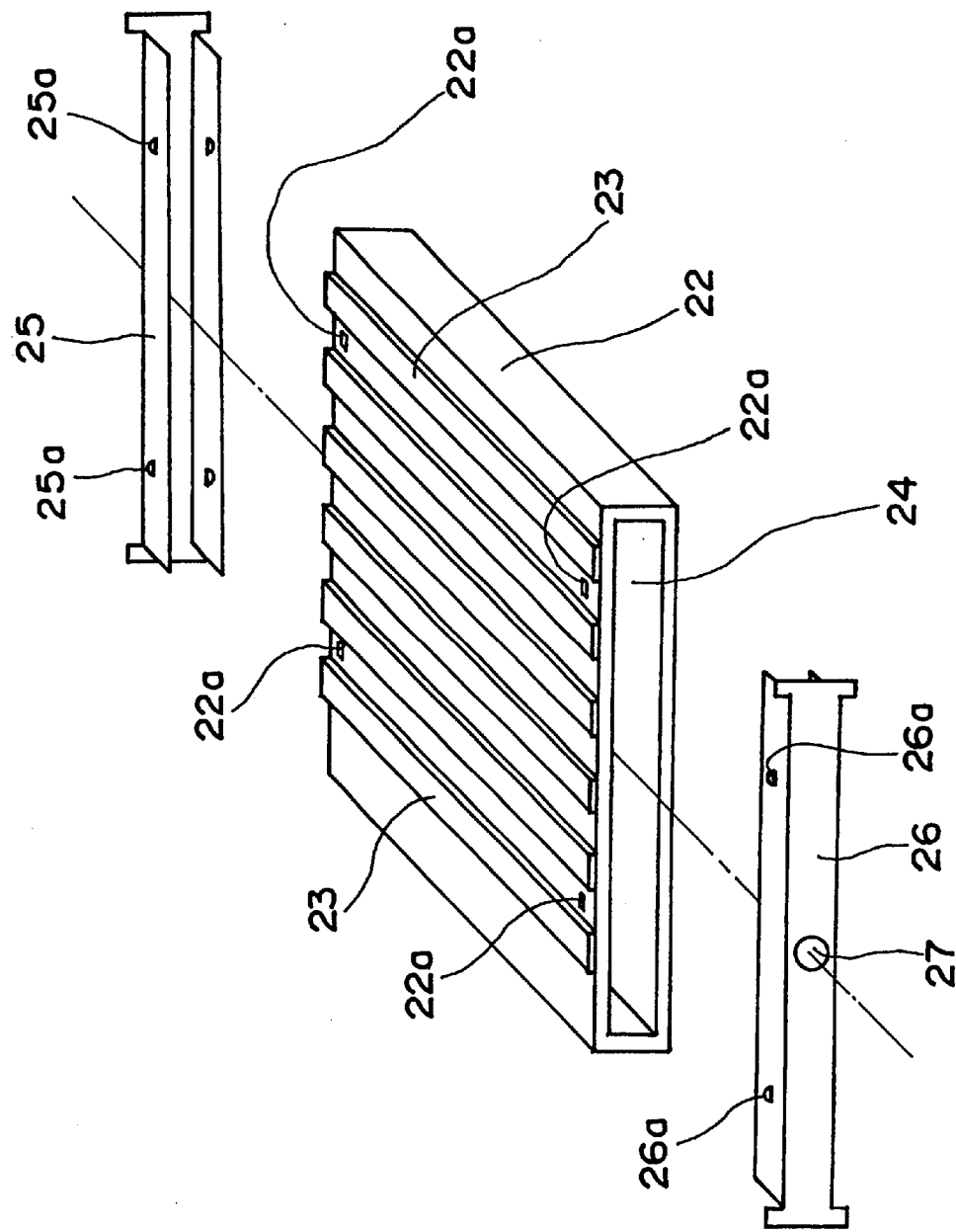
FIG. 4 is an exploded perspective view, showing the cultivating apparatus shown in FIG. 3.

In the first embodiment, the microporous boxes 12, 13 used as separate members are combined with each other; however, a second embodiment uses a cultivating apparatus 10 comprising a microporous cylinder 22. The cylinder 22 has a rectangular cross-section obtained by subjecting clay to extrusion molding and firing as shown in FIG. 3 or 4.

On one side surface of the above-mentioned microporous cylinder 22, plural number of projected stripes 23 are provided in parallel. In addition, just as the above-mentioned cultivating apparatus 10, the inner space 24 of the above-mentioned microporous cylinder 22 is filled with fibers such as glass fiber or the like (not shown), and the upper and lower opening portions thereof are closed with covers 25, 26. Furthermore, in the cover 26, an insertion hole 27, into which a water supply rope 21 formed of twisted glass fibers or the like can be inserted, is provided. This water supply rope 21 is covered with a cylindrical shield cover. This is done to ensure the capillary phenomenon and to shut light to prevent photosynthesis, thereby inhibiting fungi, algae and the like from generating.

Except for the molding method, the material to be fired, firing method and the like of the above-mentioned microporous cylinder 22 are almost the same as those for the above-mentioned first embodiment, and the explanations of these are omitted.

Hence, the projections 25a, 26a on the covers 25, 26, respectively, are engaged with the engagement holes 22a in the above-mentioned microporous cylinder 22 filled with fibers (not shown) to form the cultivating apparatus 10. Furthermore, just as the above-mentioned first embodiment, the two above-mentioned cultivating apparatuses 10, 10 are overlaid each other, and the cultivated plants 30 are allowed to take root in the spaces formed between the cultivating apparatuses 10, 10 so as to be cultivated.

Since clay is molded by extrusion, the present embodiment has the advantage of easiness in mass production and of higher productivity.

Figure 5A:
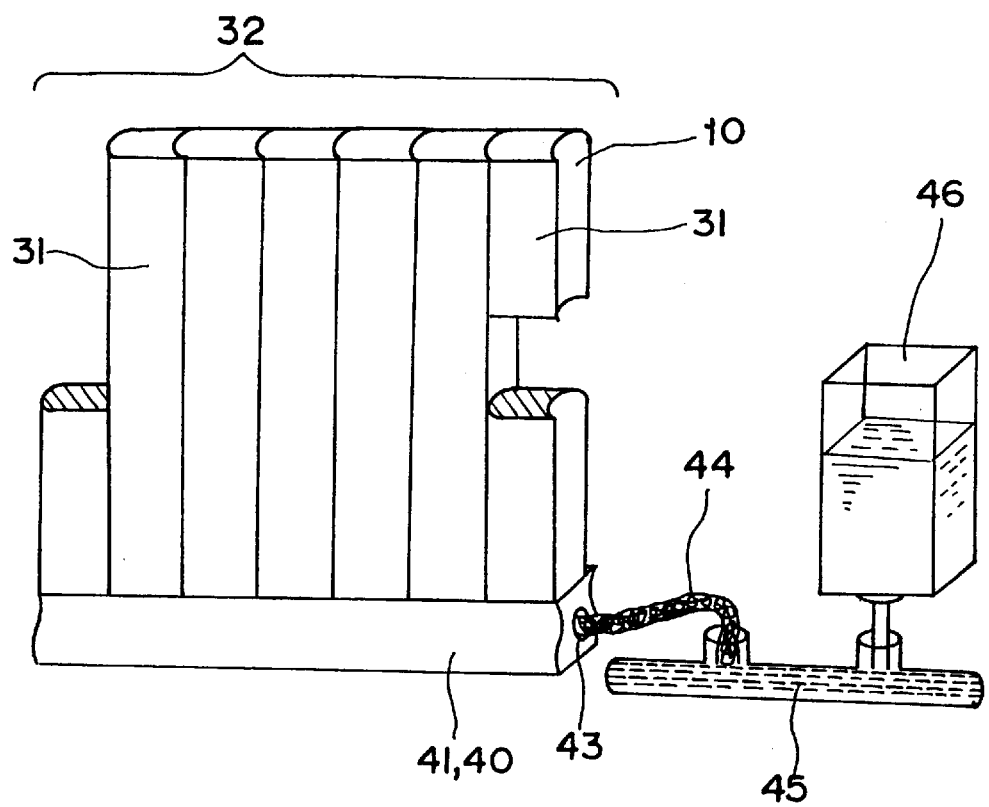
FIG. 5A is a partially cutaway perspective view, showing a third embodiment of the present invention.
Figure 5B:
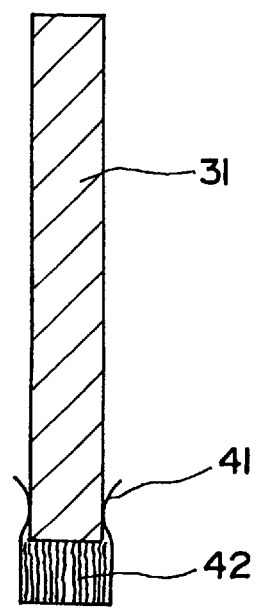
FIG. 5B is a vertical sectional view thereof.
Figure 5C:
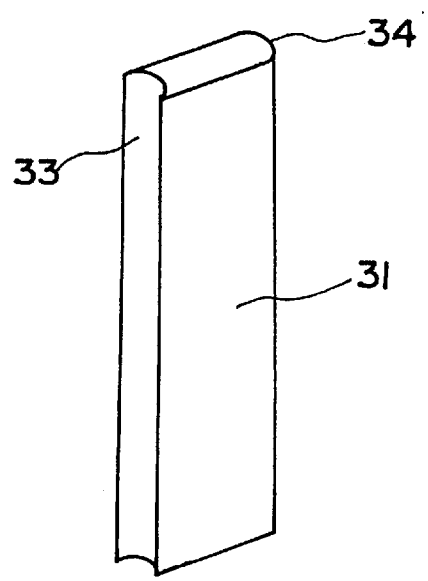
FIG. 5C is a perspective view, showing a microporous prism.

In a third embodiment, as shown in FIG. 5A, FIG. 5B and FIG. 5C, a microporous plate 32 formed by combining plural microporous prisms 31 is mounted on a nutrient/water supply member 40 to form a cultivating apparatus 10.

In other words, a semicircular dent 33 and a semicircular projection 34 are formed on the side end surfaces of the microporous prism 31 so as to be able to fit mutually, thereby to increase contact area and to facilitate positioning. Furthermore, the contact surfaces thereof are partially attached with adhesive so as to be integrated, or tightened with a tightening belt (not shown) so as to be integrated, in order to form the microporous plate 32. The method of producing the microporous prism 31 is the same as those for the above-mentioned embodiments, and the explanations of the method are omitted.

The nutrient/water supply member 40 is obtained by mounting the above-mentioned microporous plate 32 on a shallow long box 41 filled with fibers 42 such as glass fiber. Furthermore, one end of a water supply rope 44 made of twisted glass fibers is inserted into a through hole 43 provided on a side end surface of the above-mentioned box 41. Moreover, the other end of the water supply rope 44 is connected to a water supply tank 46 via a water supply pipe 45.

Figure 6A:
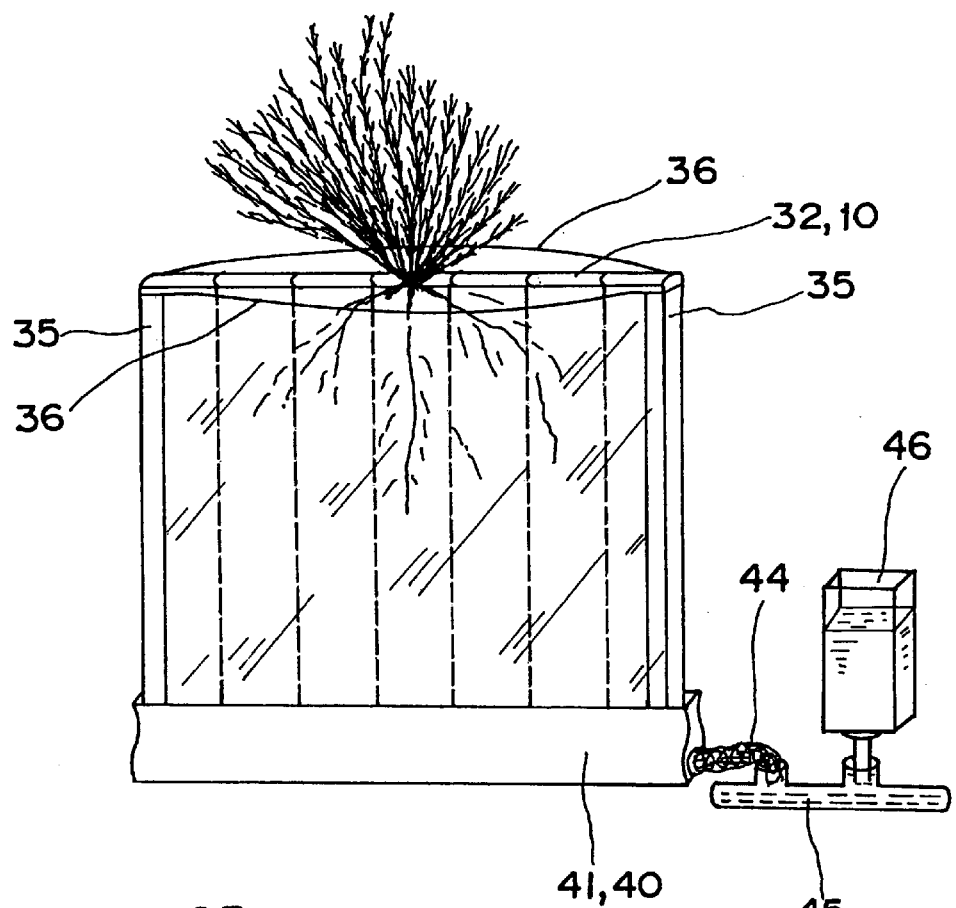
FIG. 6A is a perspective view, showing a condition when the third embodiment shown in FIG. 5A is applied.
Figure 6B:
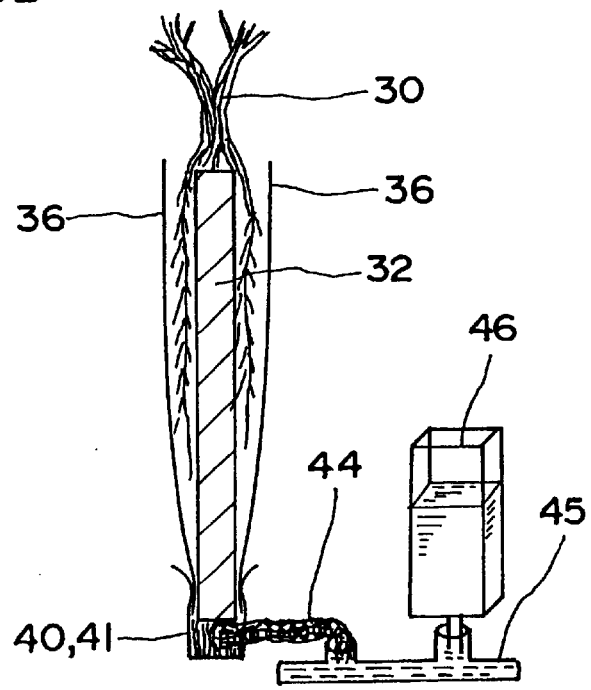
FIG. 6B is a vertical sectional view thereof.

In the case when the cultivating apparatus of the third embodiment is used, as shown in FIG. 6A and FIG. 6B, the front and rear surfaces of the microporous plate 32 are covered with water-impermeable sheets 36, 36 made of polypropylene or the like used as kind of water-impermeable flat element. Both ends of the water-impermeable sheets 36, 36 are supported by holders 35, 35 provided at both ends of the microporous plate 32. With this way, the cultivated plant 30 can be allowed to take root at the upper end portion of the microporous plate 32 so as to be cultivated. The water-impermeable sheets 36 are used to prevent water to evaporate and to shield light.

Although the water-impermeable sheet 36 is a kind of water-impermeable flat element, the water-impermeable flat element is not necessarily limited to this, and a water supply tank made of metal may be used in this embodiment.

Figure 7:
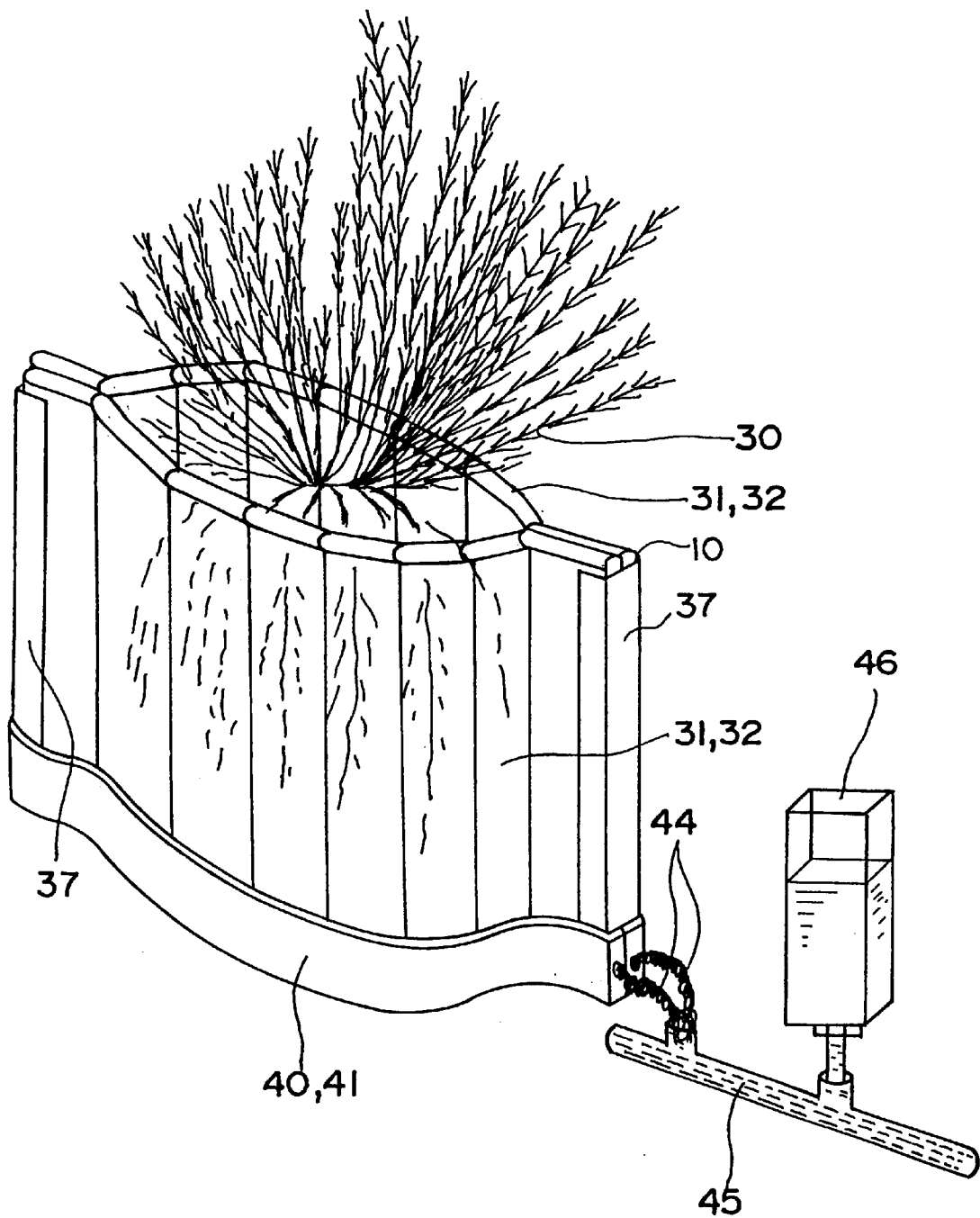
FIG. 7 is a perspective view, showing a fourth embodiment of the present invention.

A fourth embodiment is a case wherein the microporous prisms 31 are combined to form curved microporous plates 32 as shown in FIG. 7. In this case, the box 41 is made of flexible synthetic resin. Furthermore, both ends of the microporous plates 32 used as a pair are connected by holders 37, 37. The cultivated plant 30 is allowed to take root in the inner surfaces of the two plates so as to be cultivated. Except for this, the fourth embodiment is almost the same as the above-mentioned embodiments, and its explanations are omitted.

With the present embodiment, the cultivated plant 30 can take root in the opposed inner surfaces of the above-mentioned microporous plates 32, 32. For this reason, the present embodiment is an advantageous in that the cultivating apparatus 10 being stable and hard to fall can be obtained.

Figure 8:
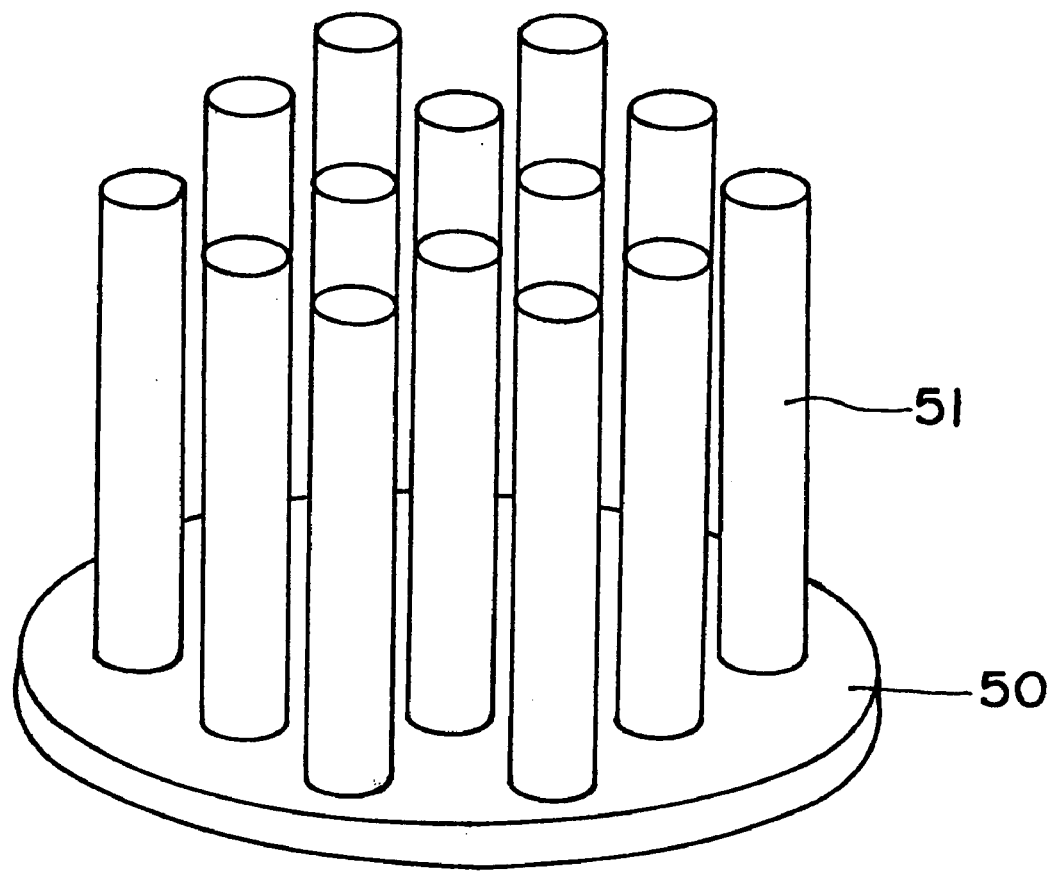
FIG. 8 is a perspective view, showing a fifth embodiment of the present invention.

A fifth embodiment is a case wherein plural rod-like projections 51 formed of a microporous fired material are provided on a plate-like base 50 formed of a microporous fired material as shown in FIG. 8. The rod-like projections 51 in accordance with the present embodiment may be integrally molded on the plate-like base 50 and then fired, or the rod-like projections 51 fired separately may be installed on the fired plate-like base 50 later.

As a method of using the present embodiment, it is supposed to use a method wherein the plate-like base 50 of the present embodiment is placed on an elastic porous material (not shown) having absorbed nutrient/water so that nutrient/water can be supplied from this.

Figure 10:
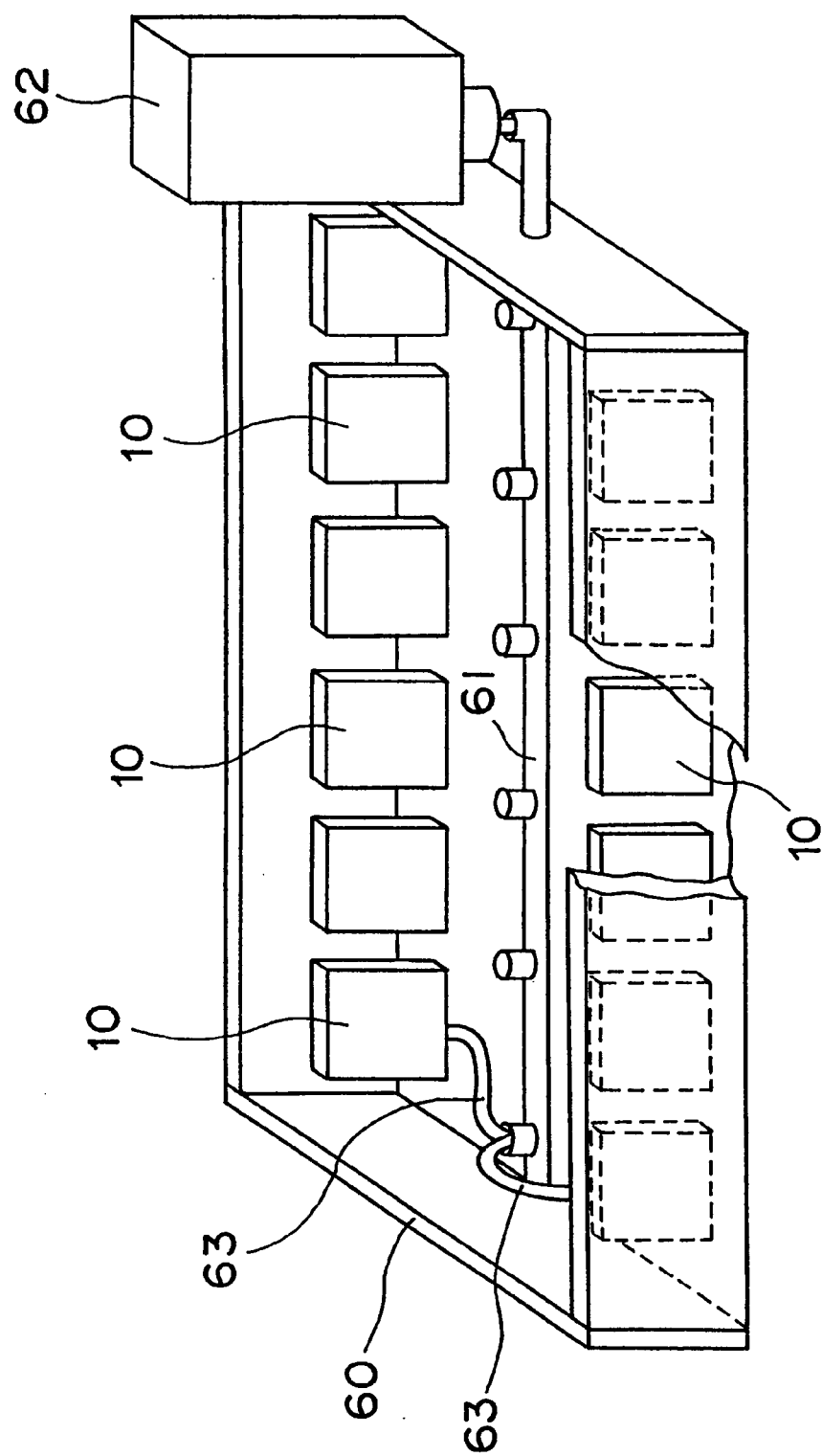
FIG. 10 is a partially cutaway perspective view, showing the arrangement of the cultivating apparatuses of FIG. 9A.

A sixth embodiment is a case wherein the cultivating apparatuses 10 in accordance with the above-mentioned first or second embodiment are used to develop an outdoor flower bed, as shown in FIG. 9A, FIG. 9B and FIG. 10.

In other words, as shown in FIG. 10, a rectangular frame 60 is formed by using cement blocks on horizontal ground, and a vinyl sheet (not shown) is laid to shut off moisture from the ground. In addition, a water supply pipe 61 is laid and connected to a water supply tank 62. Furthermore, the cultivating apparatuses 10 are arranged at a predetermined pitch on both sides of the water supply pipe 61, and the cultivating apparatuses 10 are connected to the water supply pipes 61 via water supply ropes 63 so as to supply nutrient/water. The water supply rope 63 is formed of twisted glass fibers and inserted into a flexible cylindrical shield cover to ensure the capillary phenomenon and to prevent photosynthesis.

In addition, ballast 64 is supplied appropriately into the frame 60, and the cultivated plants 30 are planted. Although the ballast 60 is supplied in this case of the present embodiment, sand or soil will do as well. Furthermore, it is not necessarily required to use a material containing organic substances, and it is acceptable to use an inorganic material, such as glass balls or the like, not containing organic substances. In particular, in the case when ballast or glass balls are supplied, the diameter of each of them should preferably be 10 mm or more. This is because the capillary phenomenon does not occur.

The adjustment of the amount of water to be supplied to the cultivating apparatuses 10 can be done by adjusting the height of the water supply pipe 61 and the level in the water supply tank 62, whereby labor for water supply can be saved.

With the present embodiment, since the cultivated plants 30 can be supported by the ballast 64 or the like, both tall herbaceous plants and woody plants can be cultivated.

In particular, when the cultivated plants are supported by using the ballast, glass balls or the like, replanting is easy, and weeds hardly grow; even if weeds grow, they can be taken care of easily.

Furthermore, even if dusts accumulate, they can be washed away easily by using highly pressurized water, and water can be drained easily. For this reason, for instance, salt remaining after spraying of a snow-melting agent can be removed easily, thereby capable of preventing damage to the plants due to salt. As a result, the present embodiment is advantageous in that it is applicable to sites where maintenance is difficult, such as median strips on roads, the inner surfaces of sound-damping walls and the like, for example.

A seventh embodiment is a case wherein cylindrical cultivating apparatuses 10 having a rectangular cross-section formed by extrusion molding are buried at a predetermined pitch in sandy soil as shown in FIG. 11A to FIG. 13.

In other words, the interior of the above-mentioned cultivating apparatus 10 is partitioned by two partition walls 71a, 71b to form hollow portions 72a, 72b, 72c. In addition, a water supply rope 73 formed of twisted glass fibers is inserted into the central hollow portion 72c filled with inorganic fibers 74, such as glass fiber, glass fiber cloth or the like.

On the other hand, the upper and lower hollow portions 72a, 72b are filled with slow effect fertilizer 75. The fertilizer 75 may have a form of replaceable film, rod, sphere or plate, or may be color-coded in accordance with the ingredients thereof. In addition, the fertilizer 75 is not necessarily to be solid, but could be cream, for example.

Figure 13:
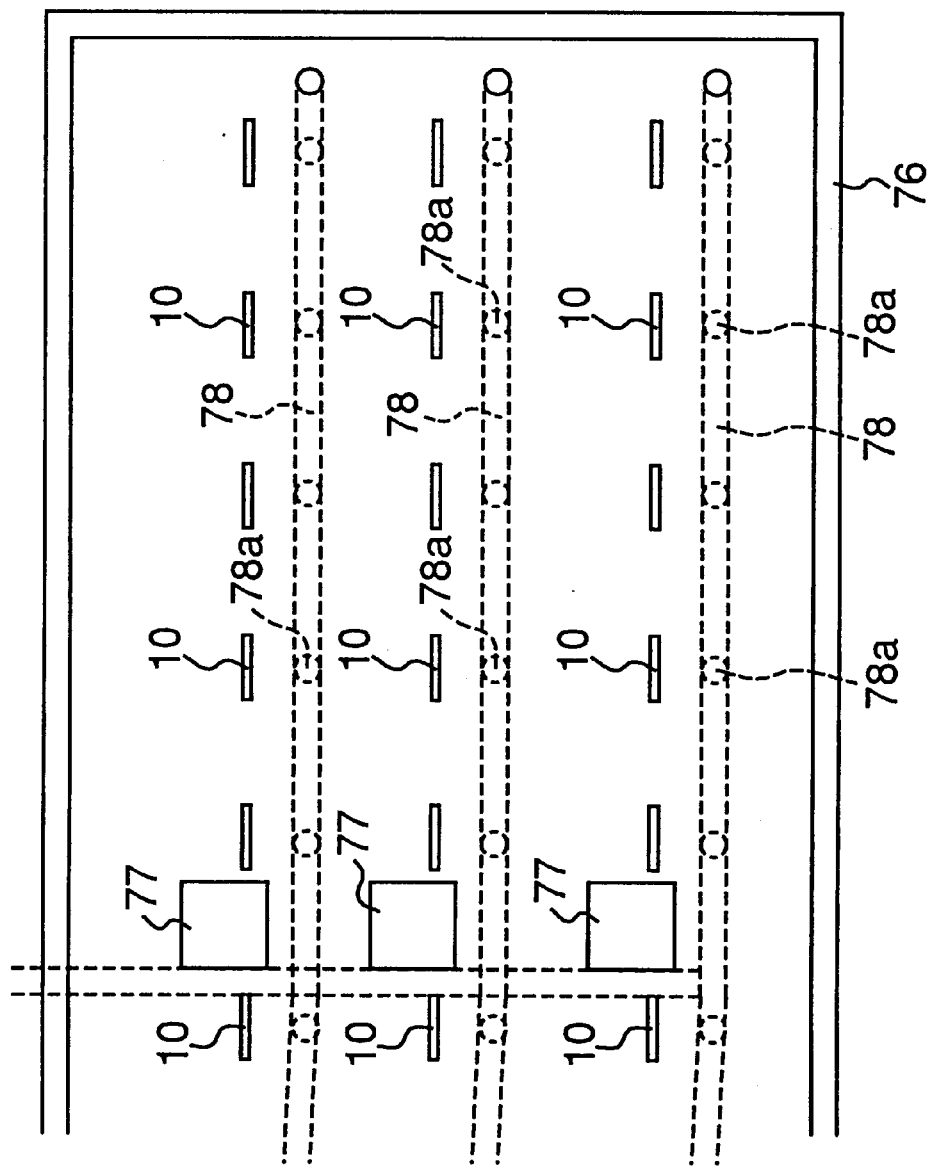
FIG. 13 is a plan view, showing the arrangement of the cultivating apparatuses shown in FIG. 11A.

Furthermore, as shown in FIG. 13, water supply tanks 77 and water supply pipes 78 are disposed inside a frame 76 provided on sandy soil, and the cultivating apparatuses 10 are laid at a predetermined pitch on one side of each of the water supply pipes 78. Furthermore, the end of the supply rope 73 is connected to the connection port 78a of the water supply pipe 78 to supply water to the cultivating apparatus 10.

The water supply rope 73 is covered with a cylindrical shield cover (not shown) in the range from the cultivating apparatus 10 to the connection port 78a.

Accordingly, water sucked up by the capillary phenomenon via the water supply rope 73 from the water supply pipe 78 oozes into the cultivating apparatus 10 through inorganic fibers 74 inside the hollow portion 72c. Furthermore, water having oozed into the hollow portions 72a, 72b dissolves the fertilizer 75 so as to become nutrient/water. In addition, the root of the cultivated plant 30 sucks the nutrient/water from the surface of the cultivating apparatus 10.

The adjustment of the amount of water to be supplied to the cultivating apparatuses 10 of the present embodiment can be done by adjusting the height of the water supply pipe 78 and the water level in the water supply tank 77.

Since the water supply rope 73 sucks only water by the capillary phenomenon in the case of the present embodiment, the generation of microbes, fungi and algae is extremely less than that in the case when nutrient/water containing dissolved fertilizer is directly supplied. For this reason, the present embodiment is advantageous in that the water supply rope 73 is hardly clogged, the concentration of nutrient/water can be controlled easily, and water and fertilizer can be saved.

The shape of the microporous fired material for the cultivating apparatus is not limited to those of the above-mentioned embodiments. The shape of the microporous fired material may be a simple flat plate, a flat plate having plural projected stripes at least on one side thereof, a corrugated plate, a simple cylinder or a cylinder with a bottom. Furthermore, the shape of the microporous fired material could even be grids or a sphere.

Moreover, although water is supplied via the water supply rope formed of twisted glass fibers in the cases of the above-mentioned embodiments, water supply is not necessarily limited to this method. Water supply may be done by directly dipping the lower end of the above-mentioned microporous fired element in water, for example.

In addition, the supply of nutrient/water is not limited to the supply from the lower end portion of the microporous fired element, but supply from the top and bottom surfaces, side surfaces or the top end portion could be done as a matter of course.

EXAMPLES

Examples of the microporous fired element used for the cultivating apparatus are described below.

Example 1

The No. 10 Clay having the chemical composition described below was formed into slurry, poured into a plaster mold under pressure, taken out after being left therein for about 40 minutes, and dried in a drying furnace at 50 to 60° C. for 9 to 10 hours, thereby obtaining a molded element having the same shape as the first microporous box for the first embodiment.

The No. 10 Clay has a following chemical composition: 64.0% by weight of $SiO_2$, 24.5% by weight of $Al_2O_3$, 0.4% by weight of $Fe_2O_3$, 0.4% by weight of $Na_2O$, 0.3% by weight of $K_2O$, 2.6% by weight of $Li_2O$, 0.5% by weight of Mg and Ca in total, 6.5% by weight of unavoidable impurities and the balance being assumed to be a measurement error.

Furthermore, the molded element has external dimensions of 140 mm in width, 140 mm in length, 27 mm in the maximum height and 6 mm in wall thickness. The molded element is provided with square projections measuring 13 mm in width and 1 mm in height at a pitch of 21 mm on one side surface thereof.

This molded element was fired at 1200° C. for 8 to 9 hours to obtain a finished sample.

Figure 14:
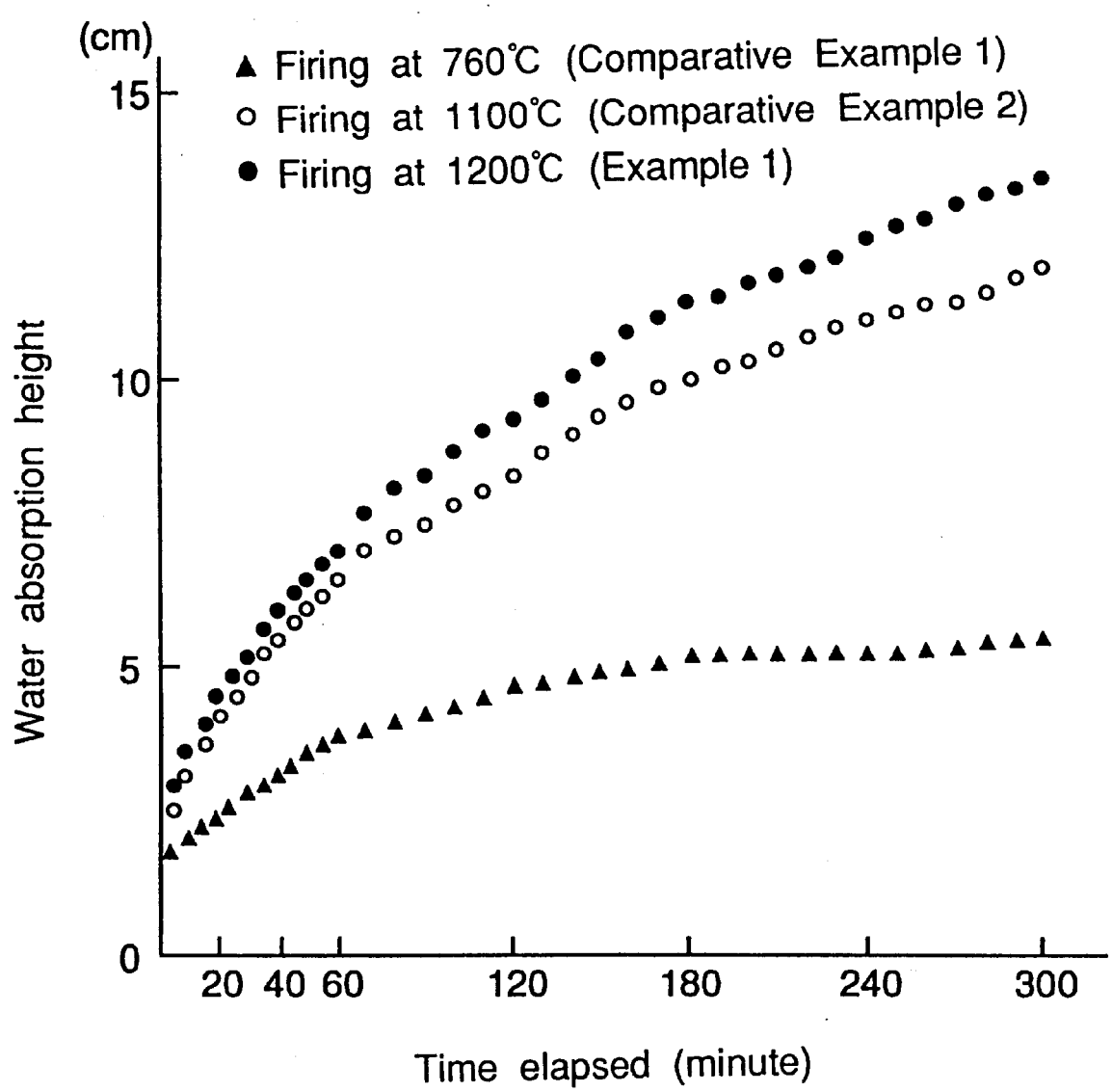
FIG. 14 is a graph, showing the measurement results of a water absorption speed test.

10 mm of the lower end of this sample was dipped in water, and its water absorption speed was measured. The measurement results are shown in FIG. 14.

Furthermore, after the sample was saturated with water, 100 cc of water was poured, and the amount of water permeation was measured. The measurement results are shown in FIG. 15.

Comparative Example 1

The conditions of producing the sample were the same with these applied for the Example 1, except that the firing temperature was 760° C., and the sample was subjected to the measurements of water absorption speed and the amount of permeation in the same conditions as those described above. The measurement results are shown in FIG. 14 and FIG. 15.

Comparative Example 2

The conditions of producing the sample were the some with these applied for the Example 1, except that the firing temperature was 1100° C., and the sample was subject to the measurements of water absorption speed and the amount of permeation. The measurement results are shown in FIG. 14 and FIG. 15.

As clearly shown in FIG. 14, it was found that the example 1 has the fastest speed and the highest water absorption height. In addition, it was also found that the example 1 had the highest water-permeability as shown in FIG. 15.

On the basis of these results, it can be judged that the example 1 with the firing temperature at 1200° C. has the highest quality, with regard to water supply to cultivated plants.

Example 2

A sample obtained by the same process as that for Example 1 was subject to the measurement of the amount of water reduction by permeation and a water content ratio test. These measurement results were shown in FIG. 16 and FIG. 17.

In the measurement of the amount of water reduction by permeation, the degree of water reduction by permeation at the time when the sample was impregnated with 100 cc of water was measured just as in the case of the Example 1.

Furthermore, the water content ratio test was carried out by measuring the water saturation weight after dipping in water for two hours and the absolute dry weight (by drying at 110° C. for 24 hours)

Comparative Example 3

The conditions of producing the sample were the same with these applied for the Example 1, except that the firing temperature was 1100° C., and the sample was subjected to the measurement of the amount of water reduction by permeation and the water content ratio test in the same conditions described above. The measurement results are shown in FIG. 16 and FIG. 17.

Comparative Example 4

The conditions of producing the sample were the same with these applied for the Example 1, except that the firing temperature was 1000° C., and the sample was subjected to the measurement of the amount of water reduction by permeation and the water content ratio test in the same conditions described above. The measurement results are shown in FIG. 16 and FIG. 17.

Figure 16:
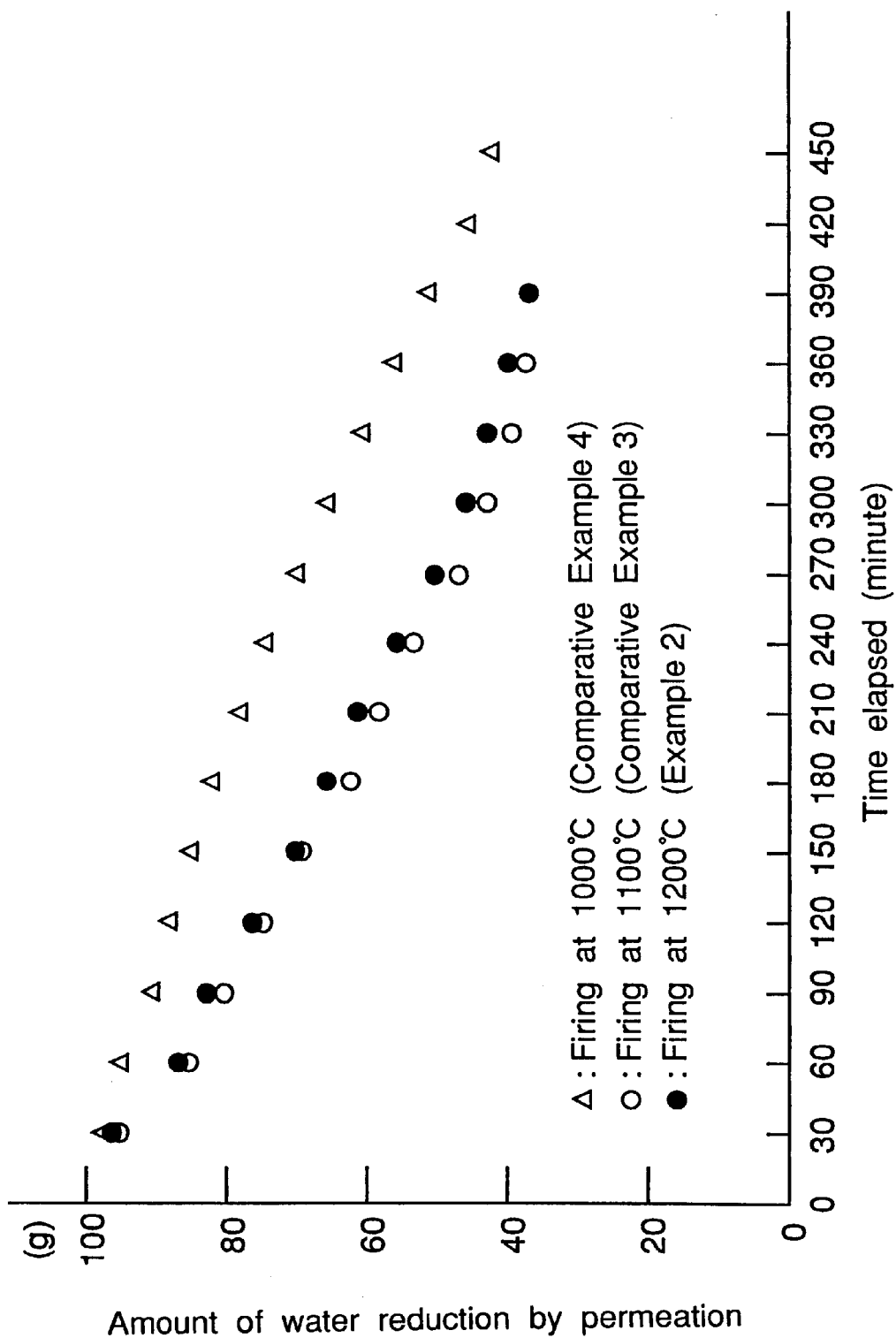
FIG. 16 is a graph, showing the measurement results of a test of water reduction by permeation.

As clearly shown in FIG. 16 and FIG. 17, it is found that this example has more water-permeable at higher firing temperature, and has higher water content ratio at lower firing temperature.

Generally, when the firing temperature is low, the fired element tends to have higher porosity, but its strength becomes lower, and sulfur content inhibiting growth of plants is apt to remain. On the other hand, when the firing temperature is high, the fired element tends to have higher strength; however, glass content tends to melt out and the desired microporous fired element cannot be obtained. For these reasons, it is necessary to appropriately select raw material to be fired, firing temperature and additives depending on the kind of plant to be cultivated.

Furthermore, when the Comparative Examples 3, 4 are allowed to absorb water, yellow streaking patterns appeared. It is assumed that this phenomenon is caused by the exudation of sulfur content. Sulfur ions hamper the growth of plants; in particular, at seedlings stage, they causes withering of the seedlings. To solve this problem, the following experiments were carried out to remove the sulfur content in the fired element.

Example 3

To remove excessive sulfur, the two kinds of samples used in Comparative Examples 3, 4 were dipped in a hydrogen peroxide solution having a concentration of 30% for 24 hours so as to be oxidized. Furthermore, they were neutralized with quicklime solution, washed with alcohol and then washed with water.

After the above process completed, when the surfaces of the samples were observed visually, the yellow streaking patterns disappeared from both the samples.

Example 4

To remove sulfate ions, the two kinds of samples used in Comparative Examples 3, 4 were dipped in a solution of 10 g of barium chloride dissolved in 1000 cc of pure water for 24 hours, and then washed with water.

After the above process completed, when the surfaces of the samples were observed visually, the yellow streaking patterns disappeared from both the samples.

Since barium chloride is highly toxic, it is necessary to add a small amount of sulfur thereto to form barium sulfate, white in color, before its disposal.

The method of removing the sulfur content is not limited to the above-mentioned method; for example, it is possible to use a method wherein the fired element is dipped in carbon disulfide and washed with water, and further dipped in alcohol and finally washed with water to remove excessive sulfur.

Furthermore, as another method of removing sulfate ions, it is possible to use a method wherein the fired element is dipped in quicklime solution and boiled for about 20 minutes, and then washed with water after cooling. In addition, it may also possible to use a method wherein the amount of sulfate ions included in the basic material to be fired, water and additives was quantitatively determined by ion exchange, and the amount of barium carbonate equivalent to that of sulfate ions is added to remove the sulfate ions.

INDUSTRIAL APPLICABILITY

The cultivating apparatus in the present invention is not limited to the above-explained embodiments but applicable to other cultivating apparatuses.

The invention being thus described, it will be obvious that the same may be varied in many ways. Such variations are not to be regarded as a departure from the spirit and scope for the invention, and all such modifications as would be obvious to one skilled in the art are intended to be included within the scope of the following claims.

What is claimed is:

1. A cultivating apparatus being characterized in that the roots of a cultivated plant contact directly with the surface of a microporous fired ceramic element to absorb such amount of fluid held in the microporous fired ceramic element as the cultivated plant requires the fluid absorbed directly from the microporous fired ceramic element.

2. The cultivating apparatus according to claim 1, wherein the cultivated plant takes root at least on the inner surfaces of the microporous fired elements disposed opposite to each other.

3. The cultivating apparatus according to claim 1, wherein the cultivated plant takes root in the clearance between the microporous fired element and a water-impermeable flat element for covering the surface of the microporous fired element.

4. The cultivating apparatus according to claim 1, wherein a part of said microporous fired element contacts with a fluid supply means.

5. The cultivating apparatus according to claim 1, wherein the fluid supply means is fiber aggregate capable of holding fluid.

6. The cultivating apparatus according to claim 1, wherein an inner space filled with fibers capable of holding fluid is formed inside the microporous fired element.

7. The cultivating apparatus according to claim 1, wherein one end of a fluid supply rope consist of fiber bundle is connected to the fluid supply means for sucking up fluid by capillary phenomenon.

8. The cultivating apparatus according to claim 7, wherein said fluid supply rope is covered with a cylindrical shield cover.

9. The cultivating apparatus according to claim 1, wherein at least two inner spaces are formed inside the microporous fired element, one of said inner spaces is filled with fibers capable of holding fluid, and the other inner space is filled with fertilizer.

10. The cultivating apparatus according to claim 9, wherein one end of a fluid supply rope is connected to the fibers inserted into the inner space for sucking up fluid by capillary phenomenon of the fiber bundle thereof.

11. The cultivating apparatus according to claim 9, wherein the inner space filled with the fibers is a through hole, and fluid can be supplied from the opening portions on both sides thereof.

12. A cultivating apparatus being characterized in that the roots of a cultivated plant directly contact with the surface of a microporous fired element to supply fluid required for the cultivated plant, wherein the cultivated plant is allowed to take root in a clearance between the microporous fired element and a water-impermeable flat element for covering the surface of the microporous fired element.

13. The cultivating apparatus according to claim 12, wherein a part of said microporous fired element is in contact with a fluid supply means.

14. The cultivating apparatus according to claim 12, wherein the fluid supply means is a fluid supply rope consisting of a fiber bundle.

15. The cultivating apparatus according to claim 12, wherein the fluid supply means is fiber aggregate capable of holding fluid.

16. The cultivating apparatus according to claim 12, wherein an inner space filled with fibers capable of holding fluid is formed inside the microporous fired element.

17. The cultivating apparatus according to claim 12, wherein one end of a fluid supply rope consist of fiber bundle is connected to the fluid by capillary phenomenon.

18. The cultivating apparatus according to claim 17, wherein said fluid supply rope is covered with a cylindrical shield cover.

19. The cultivating apparatus according to claim 12, wherein at least two inner spaces are formed inside the microporous fired element, one of said inner spaces is filled with fibers capable of holding fluid, and the other inner space is filled with fertilizer.

20. The cultivating apparatus according to claim 19, wherein one end of a fluid supply rope is connected to the fibers inserted into the inner space for sucking up fluid by capillary phenomenon of the fiber bundle thereof.

21. The cultivating apparatus according to claim 19, wherein the inner space filled with the fibers is a through hole, and fluid can be supplied from the opening portions on both sides thereof.

22. A cultivating apparatus being characterized in that the roots of a cultivated plant directly contact with the surface of a microporous fired element to supply fluid required for the cultivated plant and a fluid supply means for supplying fluid to said microporous fired element is fiber aggregate capable of holding fluid.

23. The cultivating apparatus according to claim 22, wherein the cultivated plant takes root at least on inner surfaces of the microporous fired elements disposed opposite to each other.

24. The cultivating apparatus according to claim 22, wherein the cultivated plant takes root in the clearance between the microporous fired element and a water-impermeable flat element for covering the surface of the microporous fired element.

25. The cultivating apparatus according to claim 22, wherein a part of said microporous fired element contacts a fluid supply means.

26. The cultivating apparatus according to claim 22, wherein an inner space filled with fibers capable of holding fluid is formed inside the microporous fired element.

27. The cultivating apparatus according to claim 22, wherein one end of a fluid supply rope consist of fiber bundle is connected to the fluid by capillary phenomenon.

28. The cultivating apparatus according to claim 27, wherein said fluid supply rope is covered with a cylindrical shield cover.

29. The cultivating apparatus according to claim 22, wherein at least two inner spaces are formed inside the microporous fired element, one of said inner spaces is filled with fibers capable of holding fluid, and the other inner space is filled with fertilizer.

30. The cultivating apparatus according to claim 29, wherein one end of a fluid supply rope is connected to the fibers inserted into the inner space for sucking up fluid by capillary phenomenon of the fiber bundle thereof.

31. The cultivating apparatus according to claim 29, wherein the inner space filled with the fibers is a through hole, and fluid can be supplied from the opening portions on both sides thereof.

32. A cultivating apparatus being characterized in that the roots of a cultivated plant directly contact with the surface of a microporous fired element to supply fluid required for the cultivated plant, wherein an inner space filled with fibers capable of holding fluid is formed inside the microporous fired element.

33. The cultivating apparatus according to claim 32, wherein the cultivated plant takes root at least on the inner surfaces of the microporous fired elements disposed opposite to each other.

34. The cultivating apparatus according to claim 32, wherein the cultivated plant takes root in the clearance between the microporous fired element and a water-impermeable flat element for covering the surface of the microporous fired element.

35. The cultivating apparatus according to claim 32, wherein a part of said microporous fired element contacts with a fluid supply means.

36. The cultivating apparatus according to claim 32, wherein the fluid supply means is fiber aggregate capable of holding fluid.

37. The cultivating apparatus according to claim 32, wherein one end of a fluid supply rope consist of fiber bundle is connected to the fluid by capillary phenomenon.

38. The cultivating apparatus according to claim 37, wherein said fluid supply rope is covered with a cylindrical shield cover.

39. The cultivating apparatus according to claim 32, wherein at least two inner spaces are formed inside the microporous fired element, one of said inner spaces is filled with fibers capable of holding fluid, and the other inner space is filled with fertilizer.

40. The cultivating apparatus according to claim 39, wherein one end of a fluid supply rope is connected to the fibers inserted into the inner space for sucking up fluid by capillary phenomenon of the fiber bundle thereof.

41. The cultivating apparatus according to claim 39, wherein the inner space filled with the fibers is a through hole, and fluid can be supplied from the opening portions on both sides thereof.

42. A cultivating apparatus being characterized in that the roots of a cultivated plant directly contact with the surface of a microporous fired element to supply fluid required for the cultivated plant, wherein one end of a fluid supply rope consisting of a fiber bundle is connected to the fluid by capillary phenomenon for supplying fluid to said microporous fired element.

43. The cultivating apparatus according to claim 42, wherein the cultivated plant takes root at least on the inner surfaces of the microporous fired elements disposed opposite to each other.

44. The cultivating apparatus according to claim 42, wherein the cultivated plant takes root in the clearance between the microporous fired element and a water-impermeable flat element for covering the surface of the microporous fired element.

45. The cultivating apparatus according to claim 42, wherein a part of said microporous fired element is made contact with a fluid supply means.

46. The cultivating apparatus according to claim 42, wherein the fluid supply means is a fluid supply rope consisting of a fiber bundle.

47. The cultivating apparatus according to claim 42, wherein the fluid supply means is fiber aggregate capable of holding fluid.

48. The cultivating apparatus according to claim 42, wherein an inner space filled with fibers capable of holding fluid is formed inside the microporous fired element.

49. The cultivating apparatus according to claim 48, wherein said fluid supply rope is covered with a cylindrical shield cover.

50. The cultivating apparatus according to claim 42, wherein at least two inner spaces are formed inside the microporous fired element, one of said inner spaces is filled with fibers capable of holding fluid, and the other inner space is filled with fertilizer.

51. The cultivating apparatus according to claim 50, wherein one end of a fluid supply rope is connected to the fibers inserted into the inner space for sucking up fluid by capillary phenomenon of the fiber bundle thereof.

52. The cultivating apparatus according to claim 50, wherein the inner space filled with the fibers is a through hole, and fluid can be supplied from the opening portions on both sides thereof.

53. A cultivating apparatus being characterized in that the roots of a cultivated plant directly contact with the surface of a microporous fired element to supply fluid required for the cultivated plant, wherein at least two inner spaces are formed inside the microporous fired element, one of said inner spaces is filled with fibers capable of holding fluid, and the other inner space is filled with fertilizer.

54. The cultivating apparatus according to claim 53, wherein the cultivated plant takes root at least on the inner surfaces of the microporous fired elements disposed opposite to each other.

55. The cultivating apparatus according to claim 53, wherein the cultivated plant takes root in the clearance between the microporous fired element and a water-impermeable flat element for covering the surface of the microporous fired element.

56. The cultivating apparatus according to claim 53, wherein a part of said microporous fired element is in contact with a fluid supply means.

57. The cultivating apparatus according to claim 53, wherein the fluid supply means is fiber aggregate capable of holding fluid.

58. The cultivating apparatus according to claim 53, wherein an inner space filled with fibers capable of holding fluid is formed inside the microporous fired element.

59. The cultivating apparatus according to claim 58, wherein said fluid supply rope is covered with a cylindrical shield cover.

60. The cultivating apparatus according to claim 53, wherein one end of a fluid supply rope consist of fiber bundle is connected to the fluid by capillary phenomenon.

61. The cultivating apparatus according to claim 60, wherein one end of a fluid supply rope is connected to the fibers inserted into the inner space for sucking up fluid by capillary phenomenon of the fiber bundle thereof.

62. The cultivating apparatus according to claim 60, wherein the inner space filled with the fibers is a through hole, and fluid can be supplied from the opening portions on both sides thereof.

63. A cultivating apparatus being characterized in that the fluid positioned at a level lower than a microporous fired ceramic element having a fluid suction capability is supplied to said microporous fired ceramic element by the force of a capillary phenomenon, and roots of a cultivated plant contact directly the surface of the microporous fired ceramic element to absorb such amount of fluid held in said microporous fired ceramic element as the cultivated plant requires.

64. The cultivating apparatus according to claim 63, wherein the cultivated plant takes root at least on the inner surfaces of the microporous fired elements disposed opposite to each other.

65. The cultivating apparatus according to claim 63, wherein the cultivated plant takes root in the clearance between the microporous fired element and a water-impermeable flat element for covering the surface of the microporous fired element.

66. The cultivating apparatus according to claim 63, wherein a part of said microporous fired element contacts with a fluid supply means.

67. The cultivating apparatus according to claim 63, wherein the fluid supply means is a fluid supply rope consisting of a fiber bundle.

68. The cultivating apparatus according to claim 63, wherein the fluid supply means is fiber aggregate capable of holding fluid.

69. The cultivating apparatus according to claim 63, wherein an inner space filled with fibers capable of holding fluid is formed inside the microporous fired element.

70. The cultivating apparatus according to claim 63, wherein one end of a fluid supply rope consist of fiber bundle is connected to the fluid by capillary phenomenon.

71. The cultivating apparatus according to claim 70, wherein said fluid supply rope is covered with a cylindrical shield cover.

72. The cultivating apparatus according to claim 63, wherein at least two inner spaces are formed inside the microporous fired element, one of said inner spaces is filled with fibers capable of holding fluid, and the other inner space is filled with fertilizer.

73. The cultivating apparatus according to claim 72, wherein one end of a fluid supply rope is connected to the fibers inserted into the inner space for sucking up fluid by capillary phenomenon of the fiber bundle thereof.

74. The cultivating apparatus according to claim 72, wherein the inner space filled with the fibers is a through hole, and fluid can be supplied from the opening portions on both sides thereof.

* * * * *